(12) United States Patent
Wiley, III (10) Patent No.: US 10,632,930 B1
(45) Date of Patent: Apr. 28, 2020

(54) RETAINER FOR AIDING VEHICLE TRANSPORTABILITY OF ELONGATED ITEMS

(71) Applicant: James H. Wiley, III, Dayton, OH (US)

(72) Inventor: James H. Wiley, III, Dayton, OH (US)

( * ) Notice: Subject to any disclaimer, the term of this patent is extended or adjusted under 35 U.S.C. 154(b) by 0 days.

(21) Appl. No.: 16/299,187

(22) Filed: Mar. 12, 2019

(51) Int. Cl.
*B60R 9/06* (2006.01)
*B65D 30/00* (2006.01)

(52) U.S. Cl.
CPC ............... *B60R 9/06* (2013.01); *B65D 29/00* (2013.01)

(58) Field of Classification Search
CPC ....... B60R 13/01; B60R 13/011; B60R 7/005; B60R 2011/0059; B60R 5/045; B60R 5/041; B60R 5/042; B60P 7/0823
See application file for complete search history.

(56) References Cited

U.S. PATENT DOCUMENTS

| | | | | |
|---|---|---|---|---|
| 4,877,281 A * | 10/1989 | Altmann | .................... | B60R 5/04 296/39.1 |
| 5,040,693 A * | 8/1991 | Podd, Sr. | ................ | B65D 88/72 220/1.5 |
| 5,110,171 A * | 5/1992 | Anthony | ................. | B60R 13/01 296/39.2 |
| 5,378,034 A * | 1/1995 | Nelsen | ..................... | B60J 7/102 220/666 |
| 5,683,132 A * | 11/1997 | Danzo | ....................... | B60R 7/02 296/37.16 |
| 5,722,710 A * | 3/1998 | Falciani | .................. | B60R 13/01 296/39.1 |
| 5,868,295 A * | 2/1999 | Carriere | .................... | B60R 9/00 224/404 |
| 6,203,089 B1 * | 3/2001 | Doolittle, III | .......... | B60R 13/01 296/39.1 |
| 6,536,827 B2 * | 3/2003 | Oswald | ................... | B60R 13/01 296/39.1 |
| 6,543,659 B2 * | 4/2003 | Blair | ....................... | B60R 9/045 220/9.2 |
| 6,595,568 B1 * | 7/2003 | Schroeder | ............. | B60R 13/011 296/39.1 |
| 6,729,671 B2 * | 5/2004 | Keles | ...................... | B60R 13/01 296/214 |
| 6,755,383 B2 * | 6/2004 | Davis | .................... | B60P 7/0823 248/354.7 |
| 7,178,851 B1 * | 2/2007 | Gridley | .................. | B60R 13/01 296/39.1 |
| 7,219,944 B2 * | 5/2007 | Klotz | ........................ | B60R 5/04 105/423 |
| 7,597,373 B2 * | 10/2009 | McAuliffe, Jr. | ....... | B60R 13/011 296/39.1 |

(Continued)

*Primary Examiner* — Brian D Nash
(74) *Attorney, Agent, or Firm* — R. William Graham (57) ABSTRACT

A retainer for aiding vehicle transportability includes an openable rear closure and one or more strap connection surface inwardly disposed of the rear closure of a length X, and has a lightweight bag with a bottom panel and one or more side panel connected to the bottom panel and extending upward therefrom and forming a retaining mouth, and strap portions connecting to the bag and adjustably interconnecting the side strap portions to the strap connection surfaces such that when so connected, the mouth remains inwardly disposed within the vehicle to retain items from exiting a rear of the vehicle when the rear closure is open.

11 Claims, 8 Drawing Sheets

(56) References Cited

U.S. PATENT DOCUMENTS

| | | | | |
|---|---|---|---|---|
| 8,348,324 | B2* | 1/2013 | Worden | B60R 13/011 |
| | | | | 296/39.1 |
| 8,439,422 | B2* | 5/2013 | Ricks, Jr. | B60P 7/0876 |
| | | | | 296/98 |
| 8,469,435 | B2* | 6/2013 | Ruffino | B60R 5/045 |
| | | | | 296/100.16 |
| 8,562,214 | B2* | 10/2013 | Dozier | A45C 13/002 |
| | | | | 224/404 |
| 8,568,030 | B2* | 10/2013 | Martin | B60P 7/0876 |
| | | | | 224/400 |
| D761,715 | S * | 7/2016 | Travis | D12/401 |
| 10,457,192 | B1* | 10/2019 | Heimstra | B60R 9/055 |
| 2005/0218682 | A1* | 10/2005 | Klotz | B60R 5/04 |
| | | | | 296/39.1 |
| 2006/0170173 | A1* | 8/2006 | Darling, III | A61G 1/013 |
| | | | | 280/79.2 |
| 2010/0284631 | A1* | 11/2010 | Lee | A45C 3/06 |
| | | | | 383/12 |
| 2012/0082402 | A1* | 4/2012 | Martin | B60P 7/0876 |
| | | | | 383/42 |
| 2013/0156351 | A1* | 6/2013 | Kern | A45C 3/04 |
| | | | | 383/24 |
| 2017/0129409 | A1* | 5/2017 | Arellanes | A45C 13/36 |
| 2017/0355317 | A1* | 12/2017 | Rossi | B60R 11/06 |
| 2018/0014614 | A1* | 1/2018 | Marshall | A45C 13/103 |
| 2019/0178565 | A1* | 6/2019 | Horton | F25D 23/066 |
| 2019/0322220 | A1* | 10/2019 | Linn | B60R 5/045 |

* cited by examiner

RETAINER FOR AIDING VEHICLE TRANSPORTABILITY OF ELONGATED ITEMS

BACKGROUND OF THE INVENTION

1. Field of the Invention

The field of the invention relates to a transporting items. More particularly, the invention relates to a retainer for aiding a vehicle's transportability of elongated items by increasing virtual bed length of the vehicle, such as a pickup truck, SUV's or other vehicle.

2. Description of Prior Art

There are many devices used for extending the length or load carrying capacity for beds of vehicles, such as pickup trucks. Most of the art is directed to mechanical attachments to the existing tow and hitch of the vehicle.

Some provide a rigid frame which attaches to the tow mount. Other devices use bed extension framework and other devices use rope or rail extension. All of these attempt to extend the virtual length of a bed while containing the articles. Each of these devices requires a certain amount of reconfiguration to adapt to the vehicle. In addition, these prior structures are relatively expensive and cumbersome to deploy for use and then remove and store.

There remains a need for a better way to extend the virtual length of a vehicle's transportability length. The instant invention provides a solution to the need and overcomes deficiencies in prior art. The invention is simple, relatively lightweight, durable and easily deployed and removed, and accommodate various length/height requirements. With today's popularity for pickup trucks and SUV's, the invention is suitable for ease of use by virtually anyone.

SUMMARY OF THE INVENTION

It is an object to improve a vehicle's transportability of elongated items which exceed the predefined structural rear bed length.

It is another object to provide a retainer device which increases virtual rear bed length for transportability of articles of length greater than the vehicle's predetermined bed length.

A further object is to enhance safety through the use of a retainer for enhanced virtual vehicle rear bed length.

It is still another object of the present invention to make useful application of a vehicle's dropped tail gate at about truck bed level and attach the transporting retainer of the invention adjacent the tail gate to extend the virtual bed length.

In accordance with this invention, there is provided retainer for aiding a vehicle's transportability of elongated items by increasing virtual bed length of the vehicle. The vehicle has an openable rear closure and one or more strap connection surface(s) inwardly disposed of the rear closure. The retainer includes a lightweight bag having a bottom panel portion and one or more side panel portion connected to the bottom panel portion and extending upward therefrom and forming a retaining mouth. Side straps are provided connecting to the bag and means for adjustably interconnecting the side straps to the strap connection surface (such as bed mounts) such that when so connected, the mouth remains inwardly disposed with respect to the vehicle to retain the elongated items from exiting a rear of the vehicle while the rear closure remains open.

The lightweight bag can preferably be of woven polymer (e.g., polypropylene) material which is used to form the bottom panel portion and one or more side panel portion and side straps. In one embodiment, a suitable width of the bottom and side panel portions can preferably be of a width (X−Δa) slightly smaller than a tailgate width (X). For example, the average "full size" pickup bed is designed to fit a 4 foot wide sheet of building material (e.g., drywall sheet) between the wheel wells. A full-length bed allows for 8 foot sheet items with the tailgate closed; a "short box" is typically only 6 feet long which does not permit tailgate closure. The actual dimensions are usually around 1-2 inches larger. Thus, the width of the bottom and side panels can be 4 ft−Δa which is enough width to permit the bag to be fit over within the tailgate as well as provide sufficient slack to fit one or more stock or sheet items to enter into the bag and be at least partially retained therein, for example, about 4 inches or more. The mouth formed by the bag could have a width of 50 inches by depth of 8 inches. The height or depth of the bag needs to be sufficiently wide and deep to retain the end of the sheet or stock item(s). By way of example, the width could be 4.5 ft and depth 12 inches.

The side straps are connectable to tie down points on the vehicle. In one embodiment, it is envisioned there can be tie downs can interconnect the loop portion of the straps and truck mounts. When viewed from above and in use, the retainer device appears like a sock covering a foot of the transported item(s).

The retainer of the invention may be easily removed and/or deployed and retain a variety of number of elongated items. For example, the bag is easily deployed from a folded stored state to a retaining state by dropping the tailgate of the vehicle to a horizontal position. Then, the mouth of the bag can be either slipped over the end of the elongated items which are slid inside can be inserted directly in the bag and the side straps used in conjunction with the tie downs to secure the same to the vehicle where the elongated items are brought in tight restraint against movement within the bed.

It is also envisioned that the side straps can be configured with an integral tie down portion such as a hook and ratchet. The flexibility of invention readily accommodates for variations in different vehicle styles and back bed configurations in pickup trucks, SUV's and other vehicles.

DESCRIPTION OF THE PREFERRED EMBODIMENT

Figure 1:
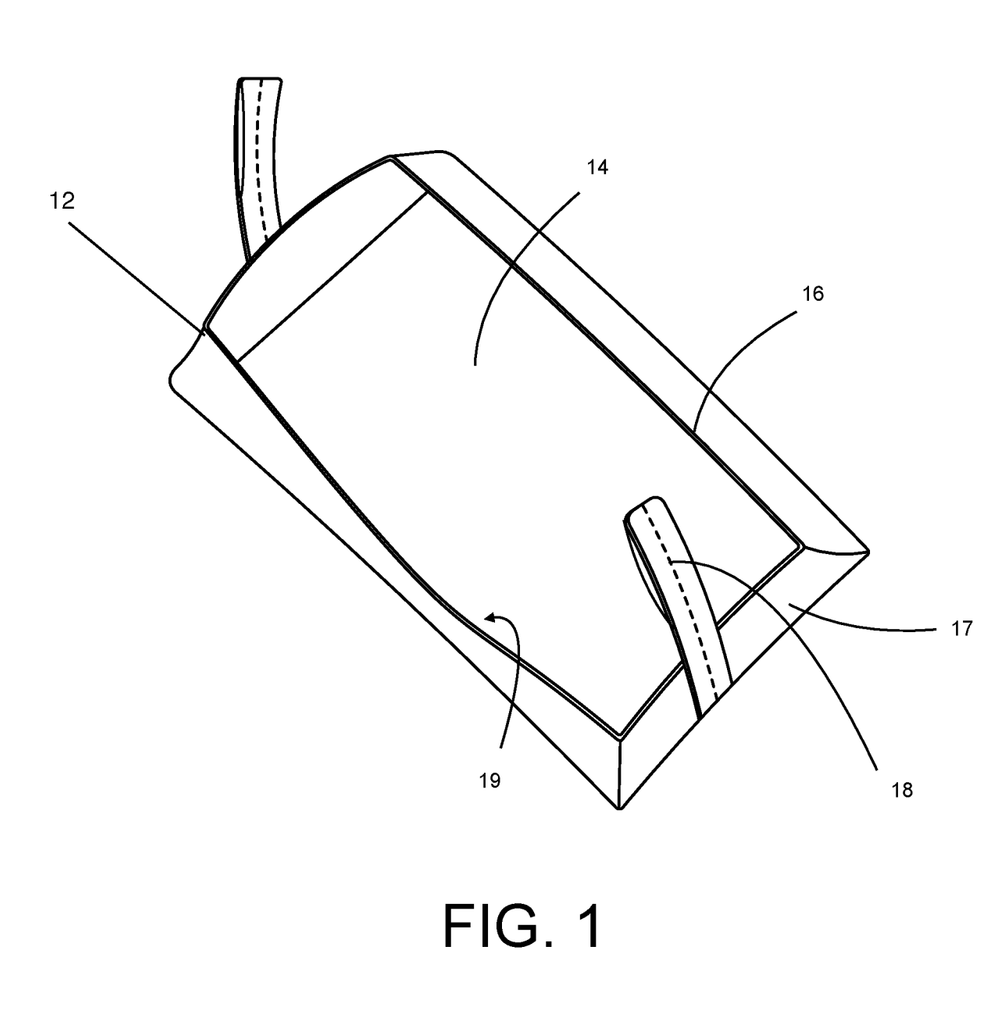
FIG. 1 illustrates a top perspective view of an embodiment of the invention.
Figure 2:
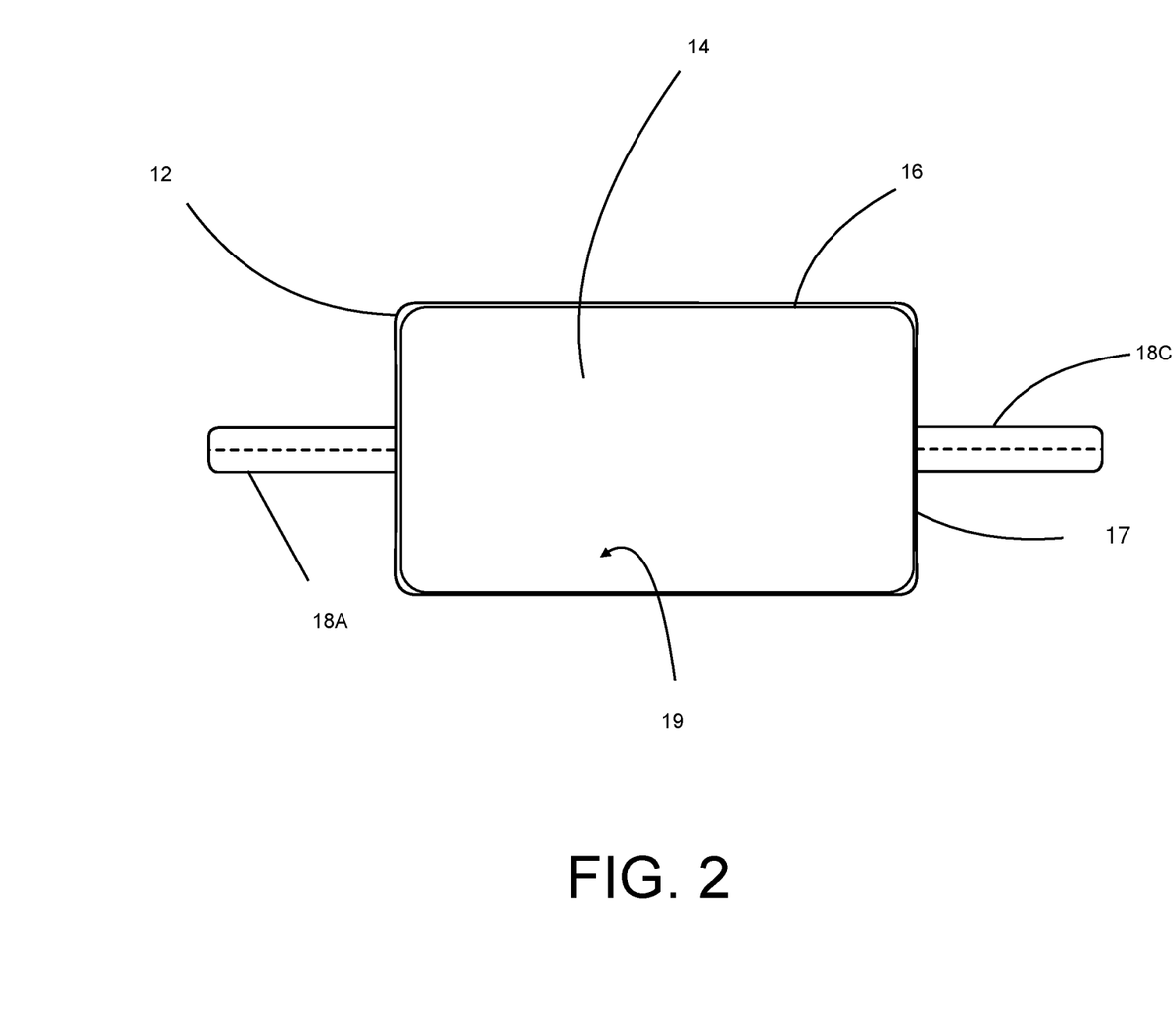
FIG. 2 illustrates a top view of FIG. 1.
Figure 3:
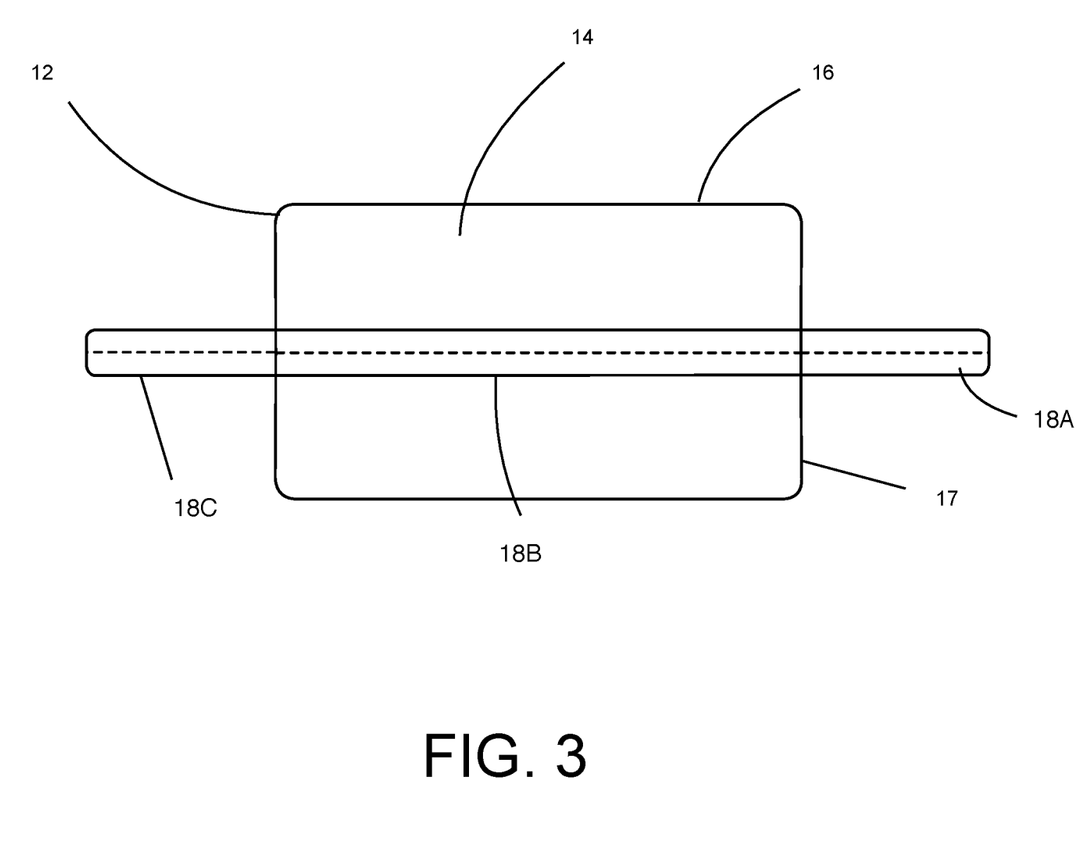
FIG. 3 illustrates a bottom view of the invention.
Figure 4:
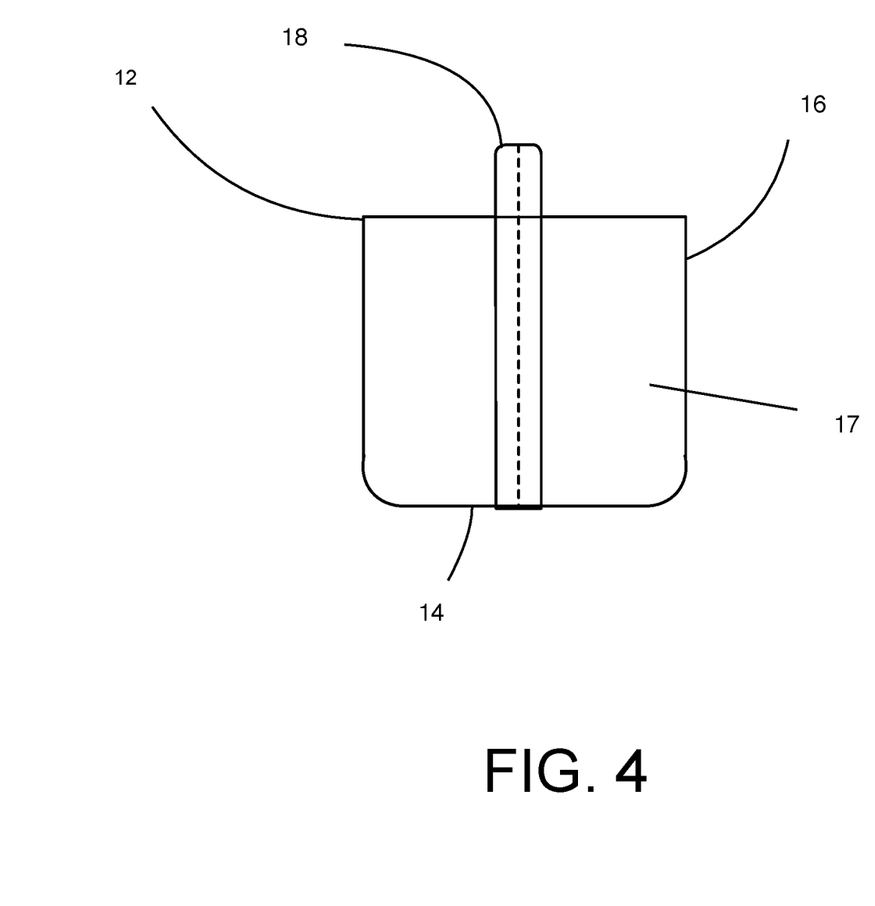
FIG. 4 shows an end view of the invention.
Figure 5:
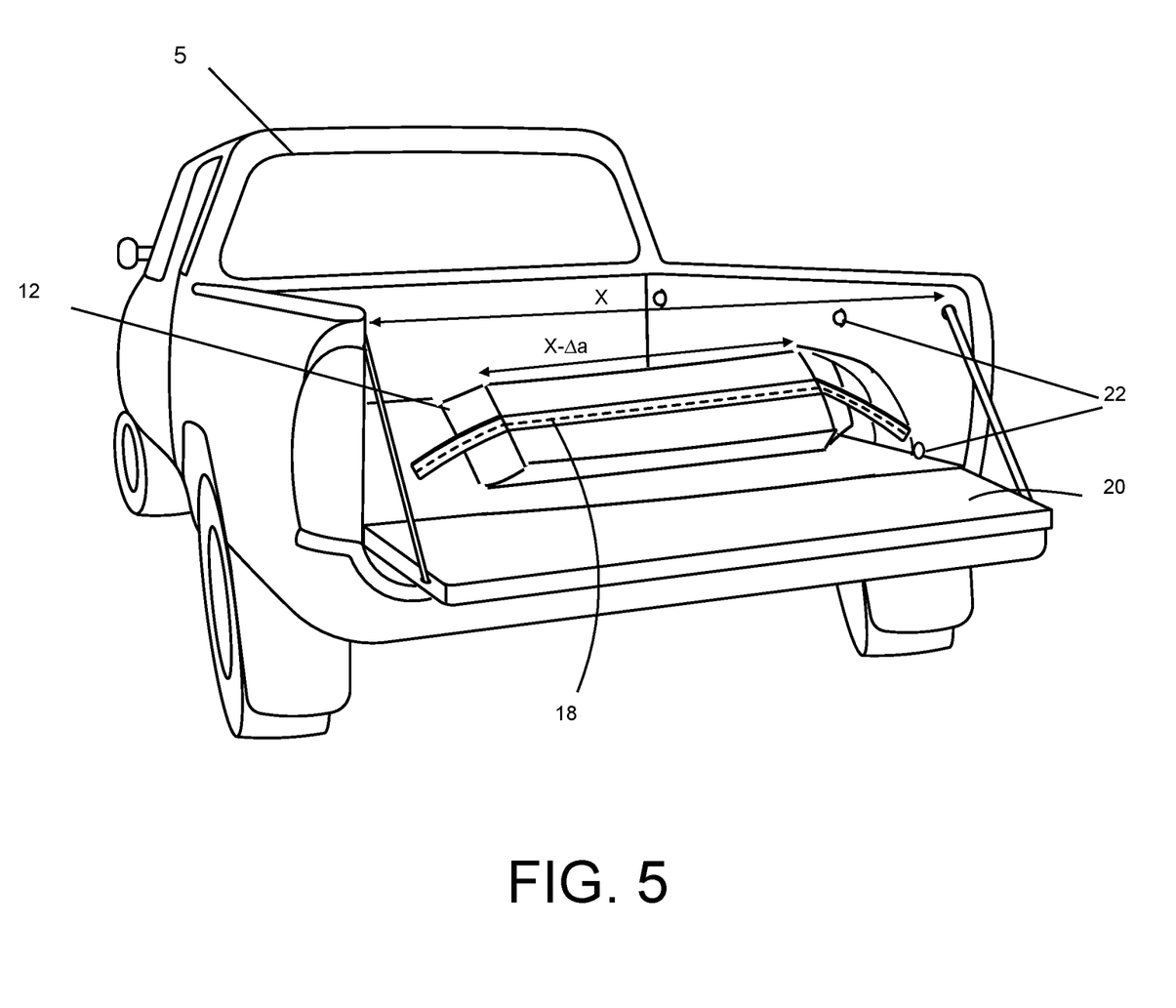
FIG. 5 shows an example of the invention is a non-use mode being readied for use.
Figure 6:
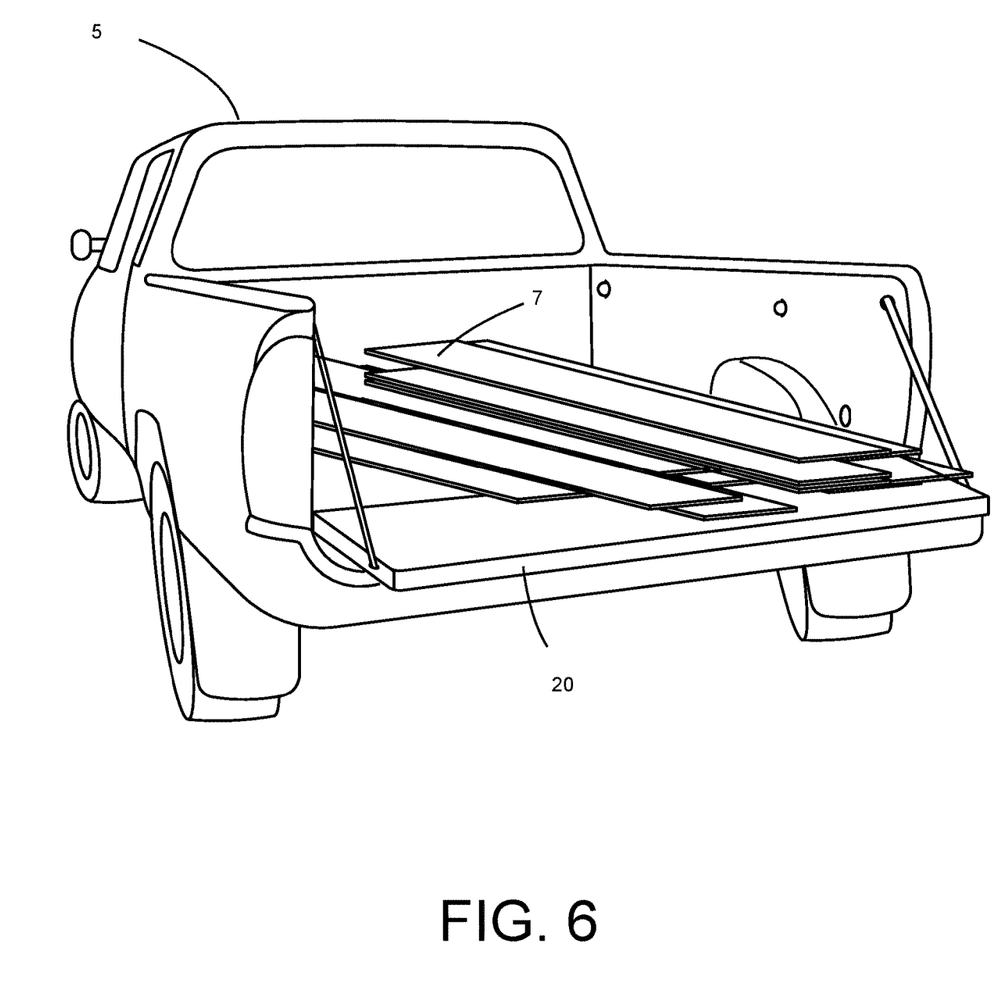
FIG. 6. depicts elongated items typically overhanding a vehicle truck bed.
Figure 7:
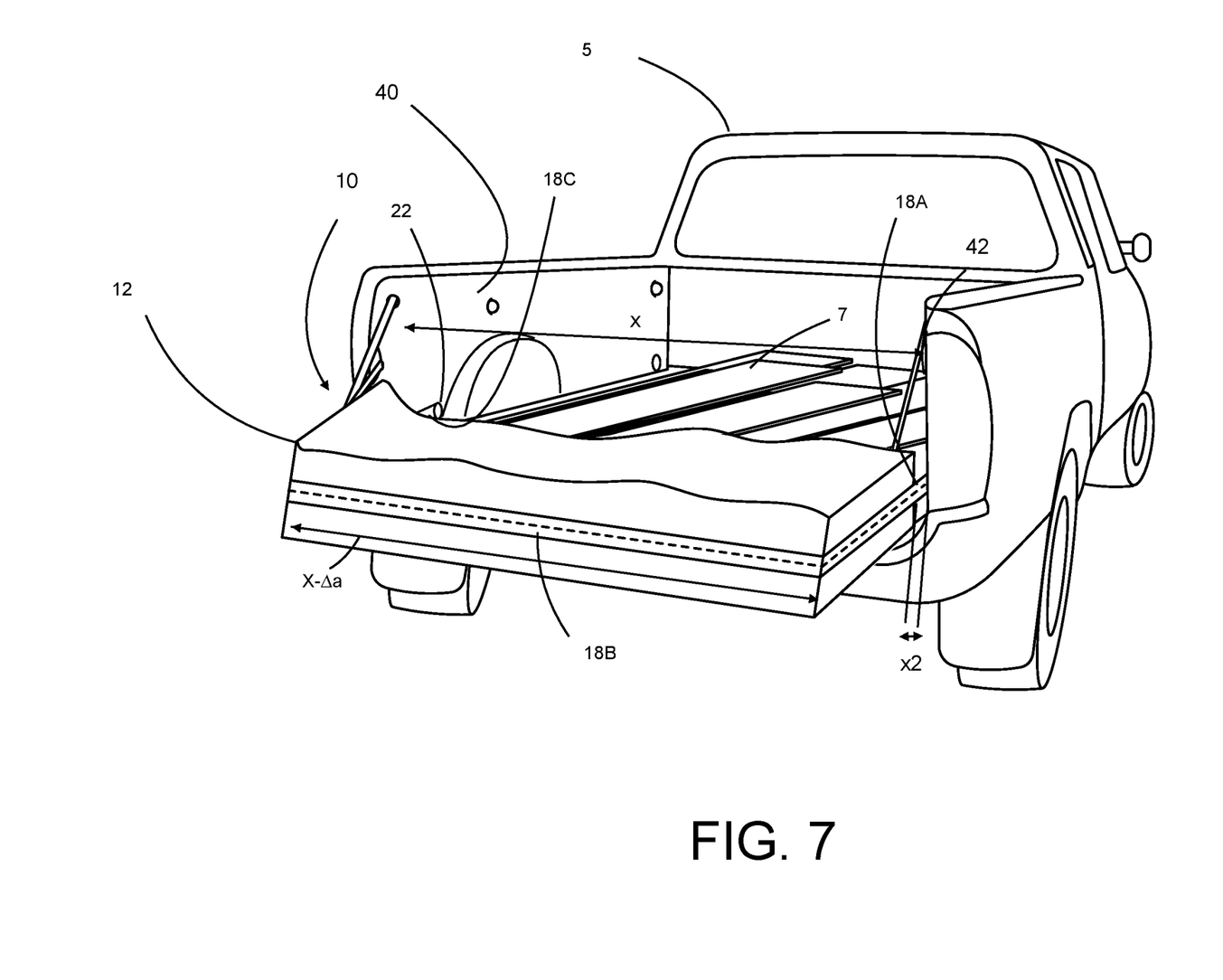
FIG. 7 illustrates an exemplary attachment of the invention to a lower rear tie down of a vehicle for retaining elongated items on a truck bed.
Figure 8:
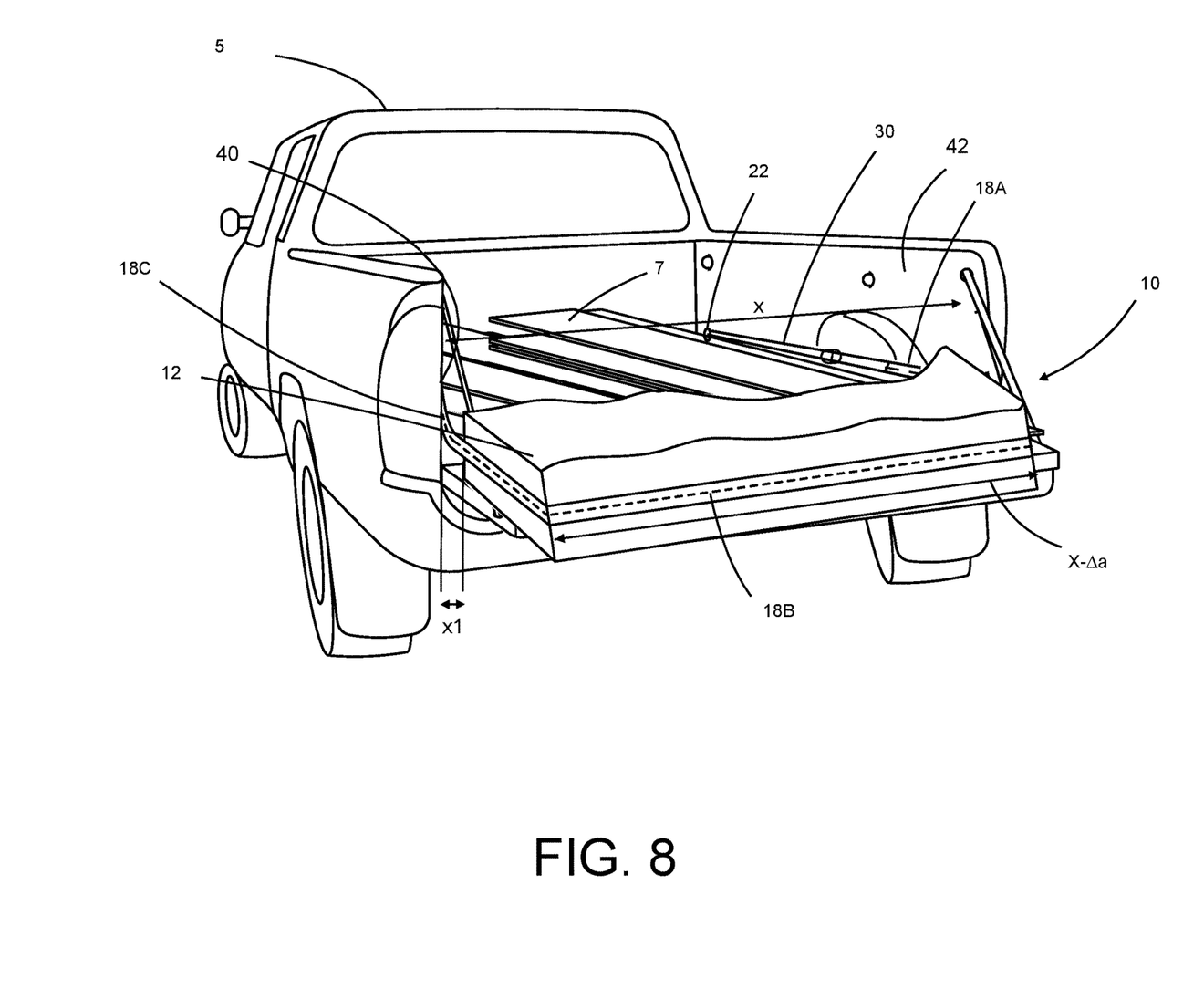
FIG. 8 illustrates an exemplary attachment of the invention to a lower forward tie down of a vehicle for retaining elongated items on a truck bed.

Referring now to the drawings, the retainer for aiding vehicle 5 transportability of elongated items 7 is generally designated by the numeral 10. The retainer 10 includes a lightweight bag 12, preferably made of woven polymer (e.g., polypropylene) material which is used to form a bottom panel portion 14, side panel portions 16, end panel portions 17 and side strap portions 18A and 18C which extend from the panels 16. The strap portions 18 can be open ended or in a loop configuration. A bottom strap portion 18B extends along the bottom panel portion 14. Collectively, the strap portions 18A-C are shown here as an integral part of a strap 18 preferably made of woven polymer (e.g., polypropylene) material.

In one embodiment, a suitable width of the bottom panel 14 and side panels 16 can preferably be a width $(X-\Delta a)$ slightly smaller than a tailgate width (X), wherein $\Delta a$ is approximate the distance x1+x2, or gap distance between length of the bottom panel and sides 40 and 42 and preferably a length of tailgate 20. For example, the average "full size" pickup bed is designed to fit a 4 foot wide sheet of material between the wheel wells. A full-length bed allows for 8 foot sheet of material with the tailgate 20 closed while a "short box" is typically only 6 feet long and does not accommodate such length material. SUV's typically do not have more than 6 feet of be length when are seats are folded down and the rear gate is closed.

Thus, the width of the bottom panel portion 14 and side panel portions 16 can be 4 ft+$\Delta a$ which is enough width to permit the bag 12 to be fit within the tailgate 20 as well as provide sufficient slack to fit one or more stock or sheet items 7 to partially enter into the bag 12 and be retained thereby, for example. A mouth 19 formed by the bag 12 could have a dimension of 50 inches by 4 inches or more. The height or depth of the bag 12 needs to be sufficiently deep to retain an end 9 of the sheet 7 or other lengthy stock item(s). By way of example, the depth of the bag 12 can be 12 inches.

The side straps 18A and 18C are connectable to tie down mounts 22 serving as strap connection surfaces on the vehicle 5. In one embodiment, it is envisioned there can be means for interconnecting, such as tie downs 30 which interconnect to the loop portion of the strap portions 18A and 18C and vehicle mounts 22. When viewed from above and in use, the retainer 10 device appears like a sock covering a foot of the item(s) 7.

The invention may be easily removed and/or installed and retain a variety of number of items. For example, the bag 10 is easily deployed from a folded stored state to a retaining state by dropping the tailgate 20 of the vehicle 5 to a horizontal position. Then, the mouth 19 of the bag 12 can be either slipped over the end 9 of the items 7, e.g., studs or sheets of lumber, slid inside the bag 12 and the side straps 18A and 18C used in conjunction with the tie downs straps 30 to secure the same to the vehicle 5.

Many people have experience in load hauling oversized loads in their vehicle. In home construction and several related trades such as plumbing, window washing and the like, long items which are not extremely heavy must occasionally be carried. Typical loads include long lumber, drywall and the plumbing pipes. Today's vehicles can handle the weight but often require additional accessories to increase the transport capacity.

It is usually the length associated with drywall, lumber, pipe and other items which render transport difficult. Every homeowner has returned home from do-it-yourself and lumber stores with extra length items extending beyond the rear of the vehicle carrying a red warning flag at the end of the lumber.

This invention will allow longer items to be safely transported when the rear closure such as the rear lid and/or tailgate is down and will perform a load-retaining function in a simple and easy to use way for most any person. The retainer of the invention can provide virtual increased bed length to more than twelve feet or so to accommodate transport of elongated building material. Thus, the invention will readily allow longer and heavier loads to be transported in a safe, easy and economical manner.

Those skilled in the art will appreciate that the conception, upon which this disclosure is based, may be readily used as a basis for other carrying devices. The dimensions of the parts of the invention are exemplary to carry out the invention, but can be varied to assist in carrying smaller width items, such as wide range of stock such as 12×1×4 stock to 12×2×16 stock. It is important, therefore, that the claims be regarded as including such equivalent constructions insofar as they do not depart from the spirit and scope of the present invention.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A retainer for aiding vehicle transportability, wherein the vehicle has an openable rear closure and one or more strap connection surface inwardly disposed of the rear closure, which includes:
    a lightweight bag made of a sheet of material including a bottom panel portion, side panel portions and end panel portions collectively forming an enclosure with an open a retaining mouth, and a pair of side strap portions connecting to said bag and extending from at least two said side panels beyond and outward from said mouth and means for adjustably interconnecting said side strap portions to the one or more strap connection surface such that when so connected, said mouth remains inwardly disposed within the vehicle to retain items from exiting a rear of the vehicle when the rear closure is open; and
a bottom strap portion extending across said bottom panel portion and said pair of side strap portions are connected to said bottom strap portion.

2. The retainer of claim 1, wherein said bag bottom panel portion and side panel portions are a width $(X-\Delta a)$ smaller than a rear closure width (X) of the vehicle.

3. The retainer of claim 1, wherein said means for interconnecting include a tie down and ratchet mechanism.

4. The retainer of claim 1, wherein said bag is made of woven polymer material.

5. The retainer of claim 1, wherein said side strap portions have an end formed in a loop configuration, wherein each said end extends beyond and outward from said mouth.

6. A retainer for aiding vehicle transportability, wherein the vehicle has a front end and an openable rear closure and one or more strap connection surface inwardly disposed of the rear closure, which includes:
    a lightweight bag made of a sheet of material including a bottom panel portion, side panel portions and end panel portions collectively forming an enclosure with an open a retaining mouth, and a pair of side strap portions connecting to said bag and extending from at least two said side panels beyond and outward from said mouth and means for adjustably interconnecting said side strap portions to the one or more strap connection surface such that when so connected, said mouth remains inwardly disposed and facing forward toward the front end of the vehicle to retain items from exiting a rear of the vehicle when the rear closure is open.

7. The retainer of claim 6, which includes a bottom strap portion extending across said bottom panel portion and said a pair of side strap portions are connected to said bottom strap portion.

8. The retainer of claim 7, wherein said side strap portions have an end formed in a loop configuration, wherein each said end extends beyond and outward from said mouth.

9. The retainer of claim 6, wherein said bag bottom panel portion and side panel portions are a width $(X-\Delta a)$ smaller than a rear closure width $(X)$ of the vehicle.

10. The retainer of claim 6, wherein said means for interconnecting include a tie down and ratchet mechanism.

11. The retainer of claim 6, wherein said bag is made of woven polymer material.

\* \* \* \* \*